United States Patent [19]

Kuwata

[11] Patent Number: 4,967,226
[45] Date of Patent: Oct. 30, 1990

[54] RE-IMAGING LENS FOR FOCUS STATE DETECTING DEVICE
[75] Inventor: Chiyuki Kuwata, Tokyo, Japan
[73] Assignee: Nikon Corporation, Tokyo, Japan
[21] Appl. No.: 329,841
[22] Filed: Mar. 28, 1989
[30] Foreign Application Priority Data
  Mar. 31, 1988 [JP] Japan .................................. 63-79562
[51] Int. Cl.$^5$ .......................... G03B 3/00; G03B 13/18
[52] U.S. Cl. ..................................... 354/406; 354/408
[58] Field of Search ............... 354/402, 407, 403, 408, 354/406

[56] References Cited
U.S. PATENT DOCUMENTS
  4,526,458  7/1985  Kanamura et al. ................. 354/406
  4,774,539  9/1988  Suda et al. ............................ 354/406
  4,841,326  6/1989  Koyama et al. ...................... 354/406

Primary Examiner—L. T. Hix
Assistant Examiner—Cassandra Spyrou
Attorney, Agent, or Firm—Shapiro and Shapiro

[57] ABSTRACT

A re-imaging lens, for use in a focus state detecting device, has first and second lens elements for re-focusing a ray of light coming from an object and third and fourth lens elements for re-focusing the ray of light coming from the object. The first, second, third and fourth lens elements are formed integrally, and the first and second lens elements have mutually the same curved surface structures which mutually abut at a boundary line, while the third and fourth lens elements have mutually the same curved surface structures which do not mutually abut but which abut on the curved surfaces of the first and second lens elements respectively at respective boundary lines.

8 Claims, 10 Drawing Sheets

RE-IMAGING LENS FOR FOCUS STATE DETECTING DEVICE

BACKGROUND OF THE INVENTION

1. Field of the Invention

The present invention relates to a re-imaging lens for use in a focus state detecting device, particularly adapted for use in a focus state detecting device for detecting the focusing state of an objective lens according to distribution of luminance in plural directions of the object.

2. Related Background Art

There is already proposed, as shown in FIG. 20, a focus state detecting device 2 employing a re-imaging lens, for detecting the focusing state of a photographing lens, for example of an automatic focusing single-lens reflex camera, according to the distribution of luminance in the horizontal and vertical directions of the object.

The focus state detecting device 2 is composed of a field mask 3 having a cross-shaped linear aperture 3X extended in the horizontal direction X and vertical direction Y from the optical axis LH, a condenser lens 4, a divided pupil mask 5 having four apertures 5a, 5b, 5c, 5d separated by a predetermined distance in the horizontal direction X and vertical direction Y from the optical axis LH, a re-imaging lens 6 consisting of four convex lenses 6a, 6b, 6c, 6d separated by a predetermined distance in the horizontal direction X and vertical direction Y from the optical axis LH, and photosensor unit 7 having a cross-shaped arrangement of four line sensors 7a, 7b, 7c, 7d, and the above-mentioned components are arranged in succession along the optical axis LH of the photographing lens 1.

The condenser lens 4 forms projected images 1a, 1b, 1c, 1d of the four apertures 5a, 5b, 5c, 5d of the divided pupil mask 5 positioned in front of the re-imaging lens 6, on the pupil of the photographing lens 1, as indicated by broken lines thereon. The field mask 3 is positioned approximately on the estimated focal lens of the photographing plane 1, whereby images of the field mask 3 are formed on the photosensor unit 7 by means of the four convex lenses 6a, 6b, 6c, 6d of the re-imaging lens 6.

Consequently, a ray of light coming from the object and passing through the first projected image 1a formed on the photographing lens 1 is guided through the field mask 3, condenser lens 4 and first aperture 5a of the divided pupil mask 5, and forms an unsharp or sharp image of the object on the first line sensor 7a of the photosensor unit 7 by means of the first convex lens 6a of the re-imaging lens 6.

On the other hand, a ray coming from the object and passing through the second projected image 1b formed on the photographing lens 1 is guided through the field mask 3, condenser lens 4 and second aperture 5b of the divided pupil mask 5, and similarly forms an image of the object on the second line sensor 7b of the photosensor unit 7, by means of the second convex lens 6b of the re-imaging lens 6.

Also with respect to the luminance distribution in the vertical direction of the object, the focusing state of the photographing lens 1 is detected from the positions of a secondary image formed on the third line sensor 7c by the ray coming from the object and passing through the third projected image 1c on the photographing lens 1 and of a secondary image formed on the fourth line sensor 7d by the ray coming from the object and passing through the fourth projected image 1d on the photographing lens 1.

In such focus state detecting device of the above-explained principle, there has been employed a re-imaging lens in which first and second convex lenses 6a, 6b of flat circular shape are positioned at an equal distance in the horizontal direction X from the optical axis LH, and third and fourth convex lenses 6c, 6d of flat circular shape are positioned at an equal distance in the vertical direction Y from the optical axis.

In such re-imaging lens 6, the first to fourth convex lenses 6a–6d are so positioned as not to contact one another, so that the sum of radii of two neighboring lenses cannot be made larger than the distance between the centers thereof. Consequently the effective areas of the convex lenses 6a–6d are relatively limited, and the light from the object, obtained through the limited projected image areas 1a–1d on the photographing lens 1 cannot be efficiently utilized.

Also there has been proposed a structure, as shown in FIGS. 21–23, having convex lenses 11a, 11b, 11c, 11d corresponding to those 6a–6d in such a manner that the first and second convex lenses 11a, 11b positioned at the same distances across the optical axis LH along the horizontal direction X overlap each other, and the third and fourth convex lenses 11c, 11d in the vertical direction Y similarly overlap each other, and that the boundaries of said convex lenses 11a, 11b, 11c, 11d run mutually orthogonally on the plane of the lens and converging on the optical axis LH.

However, such re-imaging lens 11 is not suitable if the detecting optical system for the horizontal luminance distribution is designed differently from that for the vertical luminance distribution, since the horizontal pair of convex lenses 11a, 11b is identical with the vertical pair 11c, 11d.

SUMMARY OF THE INVENTION

An object of the present invention is to provide a re-imaging lens, for use in a focus state detecting device, capable of efficiently utilizing the light obtained from the object through the objective lens, securing freedom in designing and enabling easy manufacture.

The above-mentioned object can be achieved, according to the present invention, by a focus state detecting device, for use in a camera, having first two light-receiving units arranged in a first direction across the optical axis of the photographing lens and in a plane perpendicular thereto, and second two light-receiving units arranged in a second direction across said optical axis and crossing said first direction, comprising a re-imaging optical system having first and second lens elements for re-focusing the ray of light coming from the object through the photographing lens onto said first two light-receiving units, and third and fourth lens elements for refocusing the ray of light coming from the object through the photographing lens onto said second two light-receiving units, wherein said first, second, third and fourth lens elements are formed integrally, and said first and second lens elements have mutually the same curved surface structures which mutually abut at a boundary line, while said third and fourth lens elements have mutually the same curved surface structures which do not mutually abut, but which abuts the curved surfaces the first and second lens elements respectively at respective boundary lines.

DETAILED DESCRIPTION OF THE PREFERRED EMBODIMENTS

Now the present invention will be described in detail by embodiments thereof shown in the attached drawings.

(1) Structure of the re-imaging lens

Figure 1:
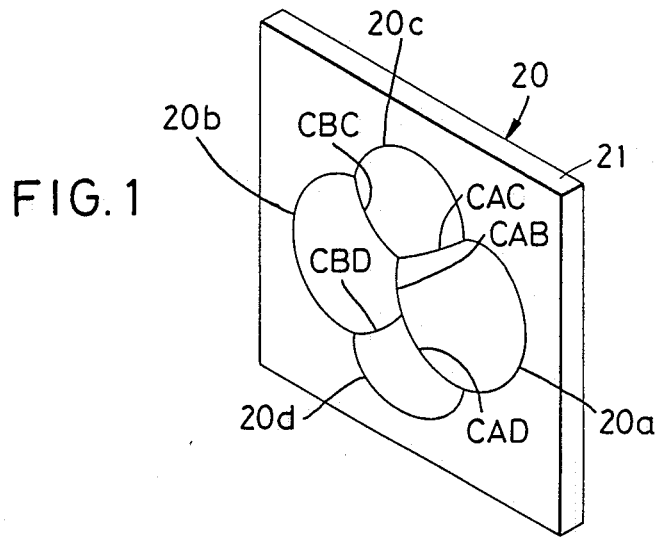
FIG. 1 is a schematic perspective view of an embodiment of the present invention.
Figure 2:
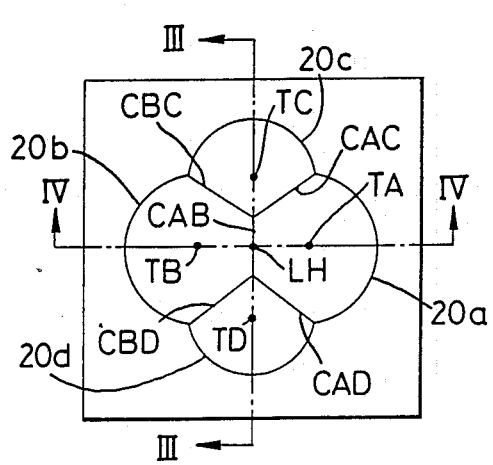
FIG. 2 is a plan view thereof.
Figure 3:
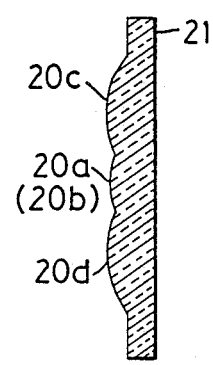
FIGS. 3 and 4 are cross-sectional views of a re-imaging lens shown in FIG. 2, in directions indicated by arrows therein.
Figure 4:

Referring to FIGS. 1 to 4, numeral 20 indicates the entire re-imaging lens of the present invention. The re-imaging lens 20 is composed of a transparent plastic plate 21 positioned in a plane perpendicular to the optical axis LH of a photographing lens 1, (see FIG. 6) and bearing, on a surface of the plate, first and second convex lenses 20a, 20b having central axes TA, TB parallel to the optical axis LH and equally distanced therefrom in the horizontal direction X, and third and fourth convex lenses 20c, 20d having central axes TC, TD parallel to said optical axis LH and equally distanced therefrom in the vertical direction Y, all formed by convex surfaces. The distances from the optical axis LH to the central axes TA, TB, TC and TD are all the same. FIG. 2 is a plan view of the re-imaging lens 20, seen from a light-receiving unit 7 shown in FIG. 6.

The first and second convex lenses 20a, 20b are composed of mutually identical aspherical surfaces, each symmetrical about the axis TA or TB, and abutting a boundary line CAB which is common to both aspherical surfaces. In practice, common boundary line CAB is formed on a plane containing the optical axis LH and perpendicular to a plane containing the central axes TA, TB of the first and second convex lenses 20a, 20b.

On the other hand, the third and fourth convex lenses 20c, 20d are composed of aspherical surfaces, identical with those of the first and second convex lenses 20a, 20b and each symmetrical about the axis TC or TD, and abutting the first and second convex lenses 20a, 20b by common boundary lines CAC, CBC and CAD, CBD.

Consequently, the re-imaging lens 20 explained above is so designed that the effective areas of the first and second convex lenses 20a, 20b arranged horizontally are significantly larger than those of the third and fourth convex lenses 20c, 20d.

It is therefore rendered possible to obtain a re-imaging lens 20 capable of arbitrarily selecting the difference between the effective areas of the first and second convex lenses 20a, 20b and those of the third and fourth convex lenses 20c, 20d, thereby achieving efficient utilization of the ray of light coming from the object through the photographing lens and still ensuring freedom in designing.

(2) Method of producing re-imaging lens

Figure 5A:
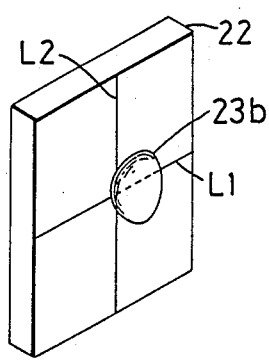
FIGS. 5A–5D are schematic perspective views showing steps of manufacture of a mold to be employed for molding the re-imaging lens.

The re-imaging lens 20 of the present embodiment can be produced in the following manner. FIG. 5 illustrates the procedure of forming a mold to be employed in the molding of re-imaging lens 20. At first, first and second lines L1, L2, mutually crossing perpendicularly and respectively in the horizontal and vertical directions, are drawn on a flat material for forming a mold 22, and a first concave surface 23b of a predetermined depth, corresponding to the form of the second convex lens 20b, is formed by precise working for example with a lathe, at a position on the first line L1 and spaced from the crossing point with the second line L2 by a distance between the optical axis LH and the central axis TB of the second convex lens 20b (FIG. 5A).

Figure 5B:
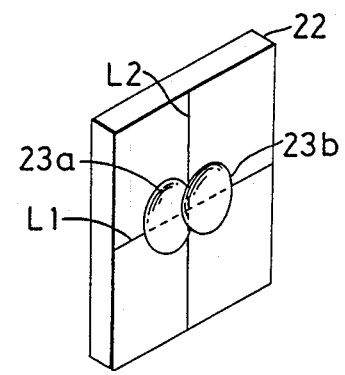

Then the flat material is re-chucked on the lathe after a displacement corresponding to twice the distance between the optical axis LH and the central axis TB of the second convex lens 20b, in a direction perpendicular to the main axis of the lathe, and there is formed a second concave surface 23a, corresponding to the form of the first convex lens 20a and identical in shape and depth with that for the second convex lens 20b (FIG. 5B).

Figure 5C:
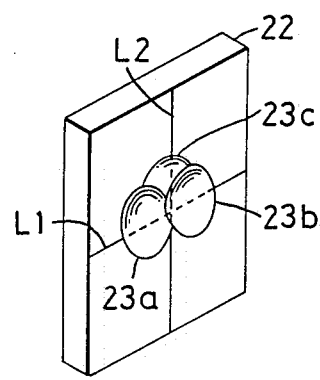

Then, in a position on the second line L2 and spaced from the crossing point thereof by a distance between the optical axis LH and the central axis TA or TB of the first or second convex lens 20a or 20b, there is formed a third concave surface 23c corresponding to the form of the third convex lens 20c and having a depth determined in consideration of the desired arrangement of the lenses and the forms thereof (FIG. 5C). For example if four concave surfaces are of substantially the same form, the depth is smaller than that of the concave surfaces 23b, 23a.

Figure 5D:
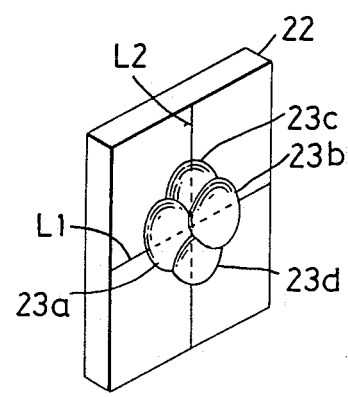

Finally the flat material is re-chucked on the lathe after a displacement corresponding to twice the distance between the optical axis LH and the central axis TA or TB of the first or second convex lens 20a or 20b, in a direction perpendicular to the main axis of the lathe, and there is formed a fourth concave surface 23d corresponding to the form of the fourth convex lens 20d and identical in shape and depth with that for the third convex lens 20c (FIG. 5D).

In the process of producing the mold 22, the distance between the first and second concave surfaces 23b, 23a, the distance between the third and fourth concave surfaces 23c, 23d, and the shapes and depths of the concave surfaces 23a-23d can be arbitrarily selected according to the lens to be produced.

The mold 22 thus obtained can be employed, for example in the injection molding of transparent resinous material, to easily obtain the re-imaging lens 20 in which the effective areas of the first and second convex lenses 20a, 20b arranged in the horizontal direction X is significantly larger than those of the third and fourth lenses 20c, 20d arranged in the vertical direction Y.

(3) Focus state detecting device utilizing the re-imaging lens

Figure 6:
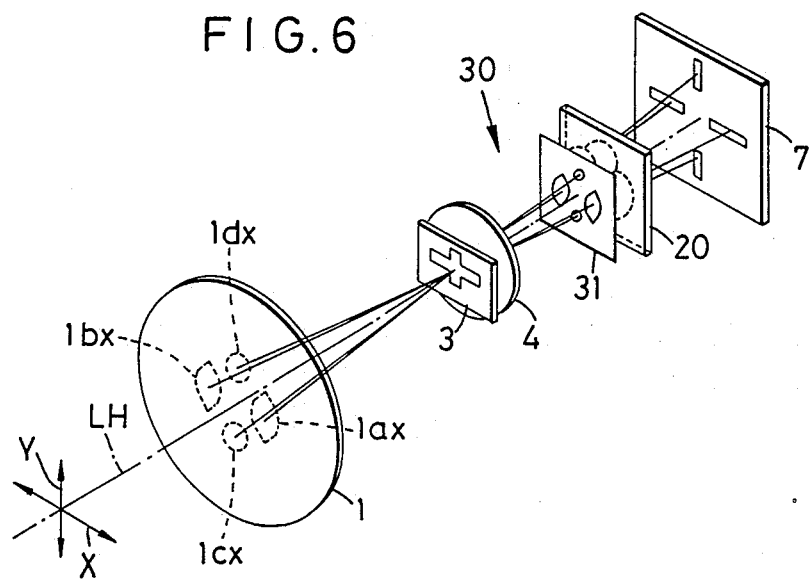
FIG. 6 is a schematic perspective view of a focus state detecting device employing said re-imaging lens.
Figure 20:
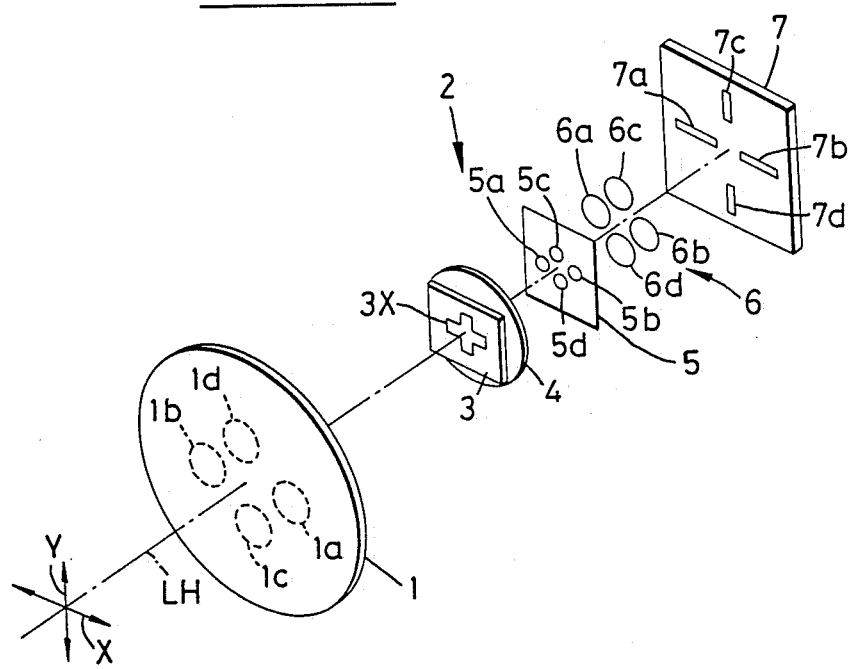
FIG. 20 is a schematic perspective view of a focus state detecting device employing a conventional re-imaging lens.
Figure 21:
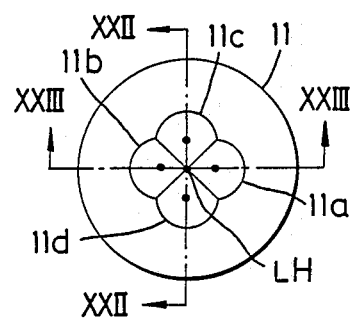
FIG. 21 is a plan view showing another conventional re-imaging lens.
Figure 22:
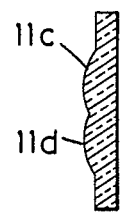
FIGS. 22 and 23 are cross-sectional views of the re-imaging lens shown in FIG. 21, seen in directions indicated by arrows therein.
Figure 23:
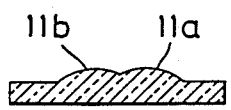

Now reference is made to FIG. 6 in which the same components as those in FIG. 20 are represented by the same numbers. There is illustrated a focus state detecting device 30, for use in a single-lens reflex camera, employing a re-imaging lens 20 of the present invention in which the effective areas of the first and second convex lenses 20a, 20b arranged in the horizontal direction are selected larger than those of the third and fourth convex lenses 20c, 20d arranged in the vertical direction.

Figure 7:
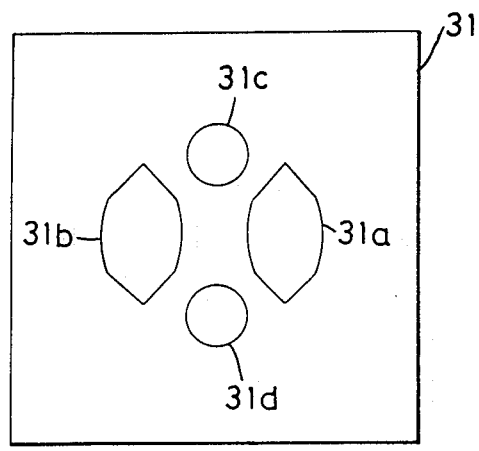
FIG. 7 is a plan view of a pupil dividing mask employed therein.

In the focus state detecting device 30, there is employed, instead of the conventional divided pupil mask 5 having the same apertures in the horizontal and vertical directions, a divided pupil mask 31 provided, as shown in FIG. 7, with vertically oblong first and second apertures 31a, 31b arranged in the horizontal direction and circular third and fourth apertures 31c, 31d arranged in the vertical direction and smaller than the first and second apertures 31a, 31b, corresponding to the difference in effective areas between the first and second convex lenses 20a, 20b and the third and fourth convex lenses 20c, 20d. FIG. 7 is a plan view of the mask 31 seen from the side of the re-imaging lens 20.

Figure 8:
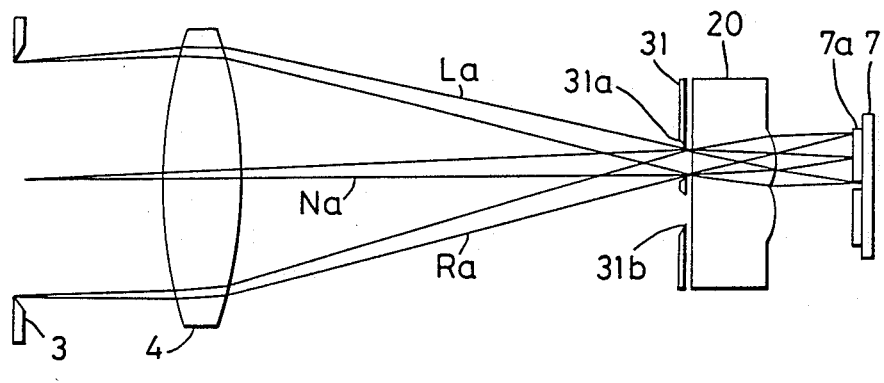
FIGS. 8 and 9 are schematic views showing the optical system of the focus state detecting device shown in FIG. 6.
Figure 9:
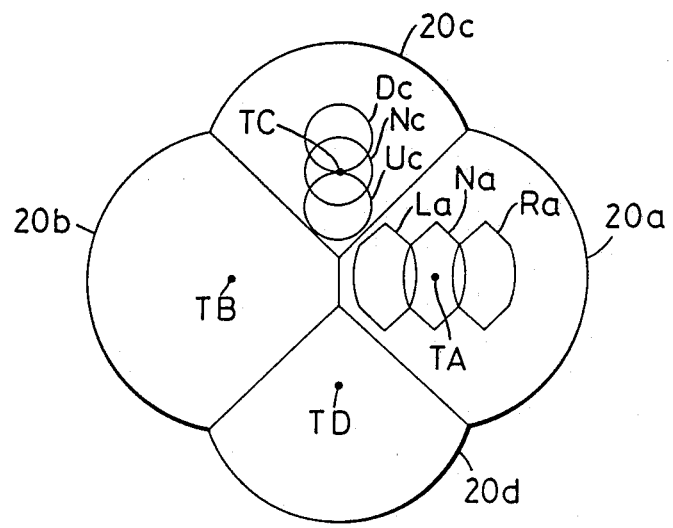

As shown in FIGS. 8 and 9, a ray La of the light coming from the object and passing for example through an area of the first projected image 1aX of the pupil of the photographing lens 1 (see FIG. 6) passes through an aperture 31a of the divided pupil mask 31 and an area, closer to the optical axis LH, of the convex lens 20a of the re-imaging lens 20 (see FIG. 9) and is focused on a part, closer to the optical axis LH, of the light sensor 7a of the light-receiving unit 7. Also a ray Na passes through the convex lens 20a at a position opposite to the passing position of the above-mentioned ray La, with respect to the optical axis LH and is focused on the central position of the line sensor 7a.

Also a ray Ra passes through the aperture 31a of the divided pupil mask 31 and the convex lens 20a at a position opposite to the, passing position of the above-mentioned ray Na, with respect to the optical axis LH and is focused on an outside portion, with respect to the optical axis LH, of the line sensor 7a. The rays of light passing through the areas 1bX, 1cX, 1dX on the pupil of the photographing lens 1 will not be explained further.

In the above-explained focus state detecting device 30, since the effective areas of the divided pupil mask 31 and the re-imaging lens 20 are selected larger in the horizontal direction than in the vertical direction, the amount of light received by the first and second line sensors 7a, 7b in the horizontal direction is significantly larger than that received by the third and fourth line sensors 7c, 7d in the vertical direction of the light-receiving unit 7, if the object has uniform luminance in the horizontal and vertical directions X, Y.

Consequently, in comparison with an automatic focusing single-lens reflex camera equipped with the focus state detecting device 2 employing conventional divided pupil mask 5 and re-imaging lens 5 of equal effective areas in the horizontal and vertical directions and thereby detecting the luminance distributions in the horizontal and vertical directions in equal manner, the luminance distribution is detected with a significantly improved sensitivity in the horizontal direction of the object but is maintained at a certain level in the vertical direction. Thus there is easily obtained an automatic focusing single-lens reflex camera, equipped with a focus state detecting device capable, in photographing a usual object, of detecting the focus state thereof by detecting the luminance distribution thereof mainly in the horizontal direction with a high sensitivity, but in photographing an object with limited luminance change in the horizontal direction (for example a person with a garment with horizontal stripe patterns or a landscape with a horizontal guard rail), of detecting the focus state of the object by detecting the luminance distribution in the vertical direction. In this manner the convenience of use by the operator can be significantly improved. Also the aspherical shape of the lenses 20a, 20b may be different from that of the lenses 20c, 20d.

Figure 10:
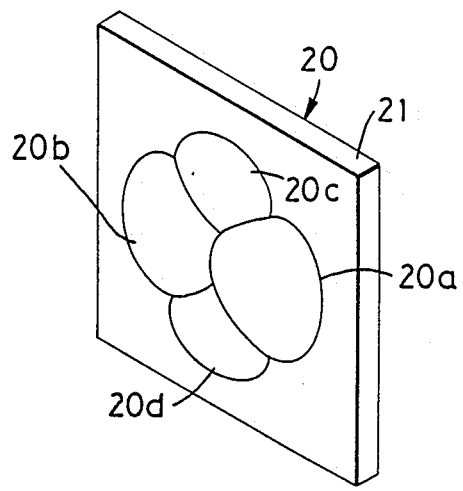
FIGS. 10, 11 and 12 are schematic views showing the re-imaging lens in which the axial distance of third and fourth lens elements is selected larger than that of first and second lens elements.
Figure 11:
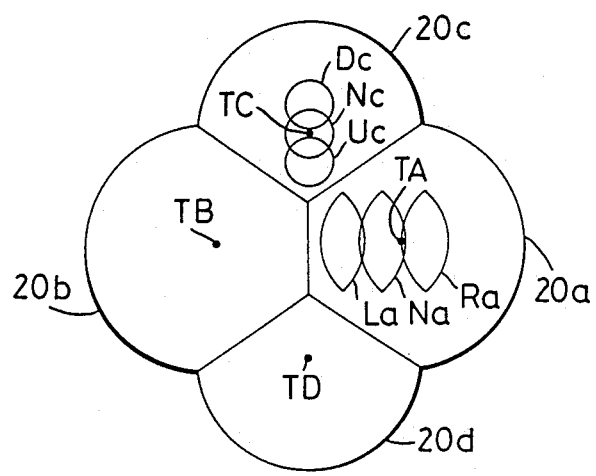

(4) Other embodiments (4—1) In the foregoing embodiment, the central axes TA-TD of the first to fourth convex lenses 20a-20d of the re-imaging lens 20 are equally distanced from the optical axis LH of the photographing lens 1, but the present invention is not limited to such embodiment. As shown in FIGS. 10 and 11, it is also possible to place the central axes TA, TB of the first and second convex lenses 20a, 20b of the horizontal direction at equal distances from the optical axis, and to place the central axes TC, TD of the third and fourth lenses in the vertical direction at equal distances from the optical axis, but larger than those of the central axes TA, TB of the first and second convex lenses 20a, 20b.

Figure 12:
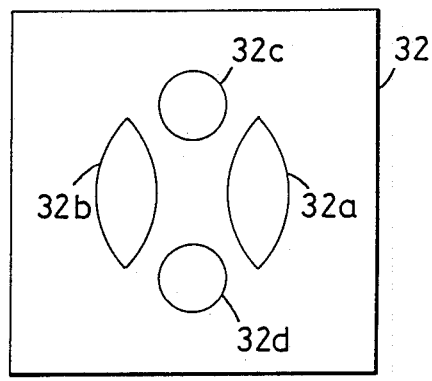
Figure 13:
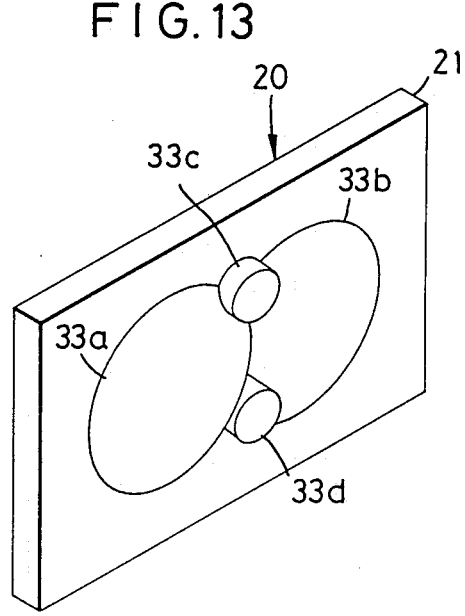
FIGS. 13, 14, 15, 16 and 17 are schematic views of re-imaging lenses having various optical systems on a rear surface opposite to the front surface having the first to fourth lens elements.
Figure 14:
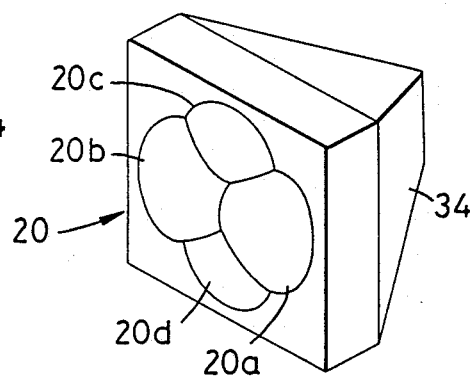
Figure 15:
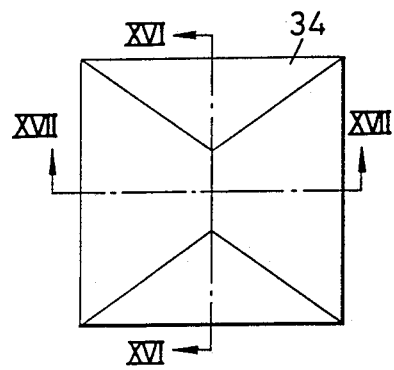
Figure 16:
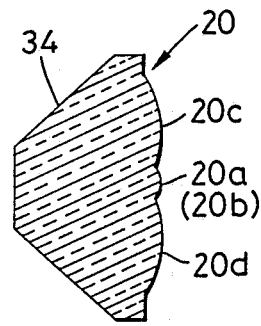
Figure 17:
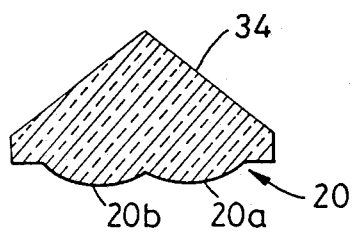

Such a re-imaging lens is preferably used in combination with a divided pupil mask 32 shown in FIG. 12, in which the distance between the centers of the apertures 32c, 32d in the vertical direction is selected larger than that of the apertures 32a, 32b in the horizontal direction, and the areas of the apertures 32a, 32b in the horizontal direction are made even larger. In comparison with the foregoing embodiment, such structure allows to further increase of the effective areas of the first and second convex lenses 20a, 20b in the horizontal direction, thereby further improving the detection sensitivity for the luminance distribution in the horizontal direction.

Such structure, in which the distance between the central axes TC, TD of the third and fourth convex lenses 20c, 20d in the vertical direction is selected larger than that between the central axes TA, TB of the first and second convex lenses 20a, 20b in the horizontal direction, allows satisfactory separation of the rays of light after the re-imaging lens 20, even when the effective areas of said first and second convex lenses 20a, 20b in the horizontal direction are increased.

Such re-imaging lens 20 can be easily obtained, in the aforementioned procedure, by displacing the position of the third concave surface 23c by a desired amount, and suitably selecting the shape and depth of the concave surfaces 23c and 23d.

(4—2) In the foregoing embodiments, the re-imaging lens 20 is provided with four convex lenses 20a-20d on the front surface thereof, but has a flat rear surface, with respect to the photographing lens 1. However, the present invention is not limited to such embodiments, and there may be formed, for example, other curved surfaces 33a–33d or a prism 34 on the rear surface, as shown in FIGS. 13 to 17.

Naturally there may be formed four convex surfaces on the rear surface, formed in the same manner as those on the front surface, and, in such case, such convex surfaces on the rear surface may be shaped different from those on the front surface. For example, the boundary lines among the convex surfaces on the rear surface may be different from those on the front surface.

Figure 18:
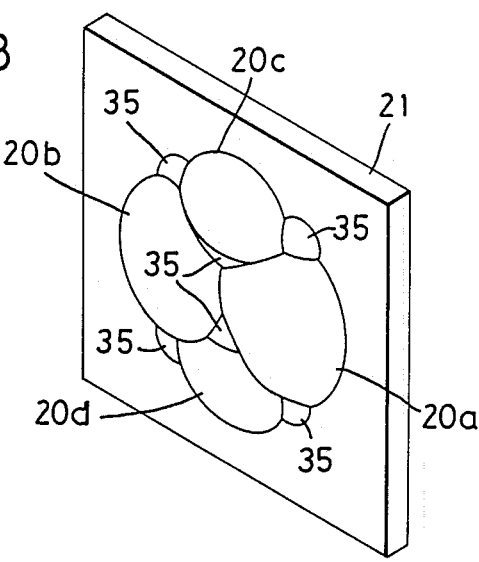
FIGS. 18 and 19 are schematic views of re-imaging lenses having various optical systems on a rear surface opposite to the front surface having the first to fourth lens elements.
Figure 19:
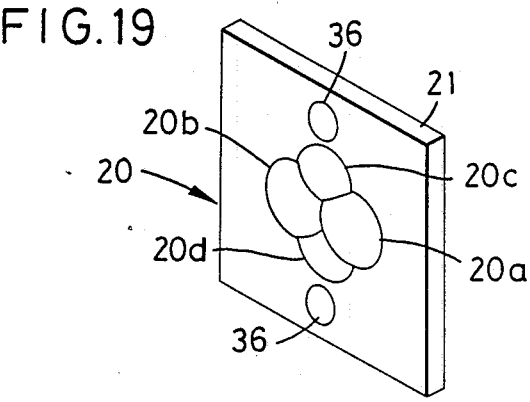

It is also possible, as shown in FIGS. 18 and 19, to form other lens elements 35, 36 on the front surface of the re-imaging lens 20, bearing the first to fourth convex lenses 20a–20d. Such re-imaging lens 20 can be used, for example, in a focus state detection based on another principle, or in a focus state detecting device designed to correct color aberration.

(4—3) In the foregoing embodiments, the mold 22 of the re-imaging lens 20 is formed by precise lathe formation of the concave surfaces 23a–23d, but it is also possible to form such mold by pressing with a hard convex mother mold separately prepared. It is furthermore possible to obtain a mold by applying a form transfer process such as electrocasting to a mother mold prepared separately. Since such process is applicable to a mother mold with relatively free choice of the constituting material, it is possible to achieve more precise form by preparing the mother mold with easily workable material.

The re-imaging lens need not necessarily be formed of plastic material as explained above, but can also be formed of glass, and, in such case, it can be produced by press molding, utilizing a mold prepared as explained above.

(4—4) The foregoing embodiments of use of the re-imaging lens in the focus state detecting device for an automatic focusing single-lens reflex camera, but the invention is advantageously applicable also to another still camera, a video camera, a movie camera, optical measuring instruments etc.

What is claimed is:

1. A focus state detecting device for use in a camera, comprising:
   (a) first two light-receiving units arranged, on a predetermined plane substantially perpendicular to the optical axis of a photographing lens, across the optical axis thereof and along a first direction;
   (b) second two light-receiving units arranged, on said predetermined plane, across said optical axis of the photographing lens and along a second direction crossing said first direction; and
   (c) a re-imaging optical system provided with first and second lens elements for re-imaging rays of light coming from an object through said photographing lens on said first two light-receiving units, and third and fourth lens elements for re-imaging rays of light coming from said object through said photographing lens on said second two light-receiving units, wherein said first, second, third and fourth lens elements are formed integrally; said first and second lens elements have mutually the same curved surface structures which mutually abut at a boundary line, while said third and fourth lens elements have mutually the same curved surface structures which do not mutually abut, and the curved surface of said third lens element abuts that of said first lens element at a boundary line and abuts that of said second lens element at a boundary line, while the curved surface of said fourth lens element abuts that of said first lens element at a boundary line and abuts that of said second lens element at a boundary line.

2. A focus state detecting device according to claim 1, wherein the areas of said first and second lens elements are larger than those of said third and fourth lens elements.

3. A focus state detecting device according to claim 2, wherein optical axes of said first, second, third and fourth lens elements are equally distanced from the optical axis of the photographing lens.

4. A focus state detecting device according to claim 2, wherein said re-imaging optical system is composed of a single optical member, bearing said first, second, third and fourth lens elements on a surface thereof facing said first two light-receiving units and second two light-receiving units, and provided further, on a surface facing the photographing lens, with fifth, sixth, seventh and eighth lens elements respectively corresponding to said first, second, third and fourth lens elements.

5. A focus state detecting device according to claim 4, wherein the areas of said fifth and sixth lens elements are larger than those of said seventh and eighth lens elements.

6. A focus state detecting device according to claim 2, wherein the optical axes of said first and second lens elements are equally distanced from the optical axis of the photographing lens, while the optical axes of said third and fourth lens elements are equally distanced from the optical axis of the photographing lens, and the distance of the optical axes of said first and second lens elements from the optical axis of the photographing lens is different from that of the optical axes of said third and fourth lens elements from the optical axis of the photographing lens.

7. A focus state detecting device according to claim 6, wherein said re-imaging optical system is composed of a single optical member, bearing said first, second, third and fourth lens elements on a surface thereof facing said first two light-receiving units and second two light-receiving units, and provided further, on a surface facing the photographing lens, with fifth, sixth, seventh and eighth lens elements respectively corresponding to said first, second, third and fourth lens elements.

8. For use in a focus state detecting device for a camera having first two light-receiving units arranged, on a predetermined plane substantially perpendicular to the optical axis of a photographing lens, across the optical axis thereof and along a first direction and second two light-receiving units arranged, on said predetermined plane, across the optical axis of said photographing lens and along a second direction crossing said first direction, a re-imaging optical system for re-imaging rays of light coming from an object through the photographing lens onto said first two light-receiving units and said second two light-receiving units, comprising:
   (a) first and second lens elements for re-imaging rays of light coming from the object through the photographing lens onto said first two light-receiving units; and
   (b) third and fourth lens elements for re-imaging rays of light coming from the object through the photographing lens onto said second two light-receiving units;

wherein said first, second, third and fourth lens elements are formed integrally; said first and second lens elements have mutually the same curved surface structures which mutually abut at a boundary line, while said third and fourth lens elements have mutually the same curved surface structures which do not mutually abut, and the curved surface of said third lens element abuts that of said first lens element at a boundary line and abuts that of said second lens element at a boundary line, while the curved surface of said fourth lens element abuts that of said first lens element at a boundary line and abuts that of said second lens element at a boundary line.

* * * * *